US012554537B2

(12) United States Patent
Verdonschot

(10) Patent No.: US 12,554,537 B2
(45) Date of Patent: Feb. 17, 2026

(54) USING RESOURCE COUNTERS TO LIMIT RESOURCE USAGE MONOPOLIZATION

(71) Applicant: SHOPIFY INC., Ottawa (CA)

(72) Inventor: Alexander Jozef Hubertus Verdonschot, Ottawa (CA)

(73) Assignee: SHOPIFY INC., Ottawa (CA)

( * ) Notice: Subject to any disclaimer, the term of this patent is extended or adjusted under 35 U.S.C. 154(b) by 1081 days.

(21) Appl. No.: 17/237,467

(22) Filed: Apr. 22, 2021

(65) Prior Publication Data

US 2022/0342701 A1   Oct. 27, 2022

(51) Int. Cl.
  *G06F 9/50*   (2006.01)
  *G06F 11/30*   (2006.01)

(52) U.S. Cl.
  CPC ........ *G06F 9/5005* (2013.01); *G06F 11/3051* (2013.01)

(58) Field of Classification Search
  CPC .. G06F 9/5005; G06F 11/3051; G06F 9/5011; G06F 2209/504
  See application file for complete search history.

(56) References Cited

U.S. PATENT DOCUMENTS

| | | | | |
|---|---|---|---|---|
| 5,570,410 A * | 10/1996 | Hooshiari | ............... | H04M 3/36 379/221.09 |
| 5,596,576 A * | 1/1997 | Milito | ................... | H04L 47/215 370/468 |
| 9,473,413 B1 * | 10/2016 | Cao | ......................... | H04L 47/38 |
| 10,334,070 B2 * | 6/2019 | Balafoutis | ............... | H04L 67/10 |
| 10,511,538 B1 * | 12/2019 | Matthews | ........... | H04L 43/0817 |
| 2004/0066298 A1 * | 4/2004 | Schmitt | ................ | A01K 15/023 340/573.3 |
| 2006/0069780 A1 * | 3/2006 | Batni | .................... | H04L 43/106 709/226 |
| 2006/0200578 A1 * | 9/2006 | Sherer | .................. | H04N 21/658 709/233 |
| 2007/0067368 A1 * | 3/2007 | Choi | ...................... | G06F 3/0659 |
| 2007/0271566 A1 * | 11/2007 | Greiner | ............... | G06F 9/30003 712/E9.032 |
| 2008/0184234 A1 * | 7/2008 | Vutharkar | ........... | H04L 41/0894 718/100 |

(Continued)

OTHER PUBLICATIONS

"Leaky bucket", Wikipedia. Enclosed printed copy is from Apr. 22, 2021, and is 11 pages. Can be accessed at "https://en.wikipedia.org/wiki/Leaky_bucket". Last amended (published) on Sep. 2, 2020.

*Primary Examiner* — Benjamin C Wu

(57) ABSTRACT

A computing resource may be monopolized or dominated by a client, if the client has a large quantity of tasks for execution and/or the tasks from that client take a long time to execute. In some embodiments, each client is associated with a respective counter, and the counter is indicative of how much the computing resource has been recently occupied by the client associated with that counter. In some embodiments, the computing resource refrains from executing new tasks for a client if its counter is within a particular range. In some embodiments, a counter increments when the computing resource is occupied by a client and decrements otherwise based on the passage of time. In some embodiments, different counters may have different rates of incrementing or decrementing, or different particular ranges.

20 Claims, 8 Drawing Sheets

(56) References Cited

U.S. PATENT DOCUMENTS

| | | | |
|---|---|---|---|
| 2009/0182608 A1* | 7/2009 | Tran | G06Q 10/109 718/102 |
| 2009/0183157 A1* | 7/2009 | Tran | G06F 9/4881 718/100 |
| 2010/0162256 A1* | 6/2010 | Branover | G06F 1/3203 718/104 |
| 2010/0211935 A1* | 8/2010 | Weber | H04L 47/821 711/E12.001 |
| 2010/0229218 A1* | 9/2010 | Kumbalimutt | G06F 9/5005 726/4 |
| 2011/0078478 A1* | 3/2011 | Branover | G06F 1/3203 713/323 |
| 2011/0153724 A1* | 6/2011 | Raja | H04L 67/1001 709/223 |
| 2011/0153839 A1* | 6/2011 | Rajan | H04L 69/16 709/227 |
| 2012/0159502 A1* | 6/2012 | Levin | G06F 9/5016 718/104 |
| 2015/0120808 A1* | 4/2015 | Bielski | H04L 67/62 709/203 |
| 2015/0347169 A1* | 12/2015 | Tsirkin | G06F 9/45545 718/1 |
| 2017/0339196 A1* | 11/2017 | Lewis | H04L 63/083 |
| 2019/0163400 A1* | 5/2019 | Acharya | G06F 3/0604 |
| 2019/0182168 A1* | 6/2019 | Bastide | H04L 67/1001 |
| 2019/0303281 A1* | 10/2019 | Firoozshahian | G06F 12/0238 |
| 2020/0366572 A1* | 11/2020 | Chauhan | H04L 41/5009 |
| 2021/0168091 A1* | 6/2021 | Sugarev | H04L 67/02 |
| 2022/0114547 A1* | 4/2022 | Dumitras | G06Q 20/145 |
| 2022/0342701 A1* | 10/2022 | Verdonschot | G06F 9/5011 |
| 2023/0115296 A1* | 4/2023 | Jaser | G06F 3/0659 711/154 |

\* cited by examiner

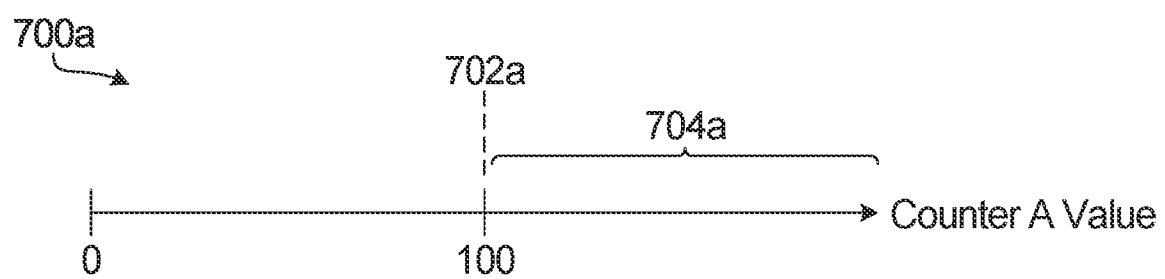
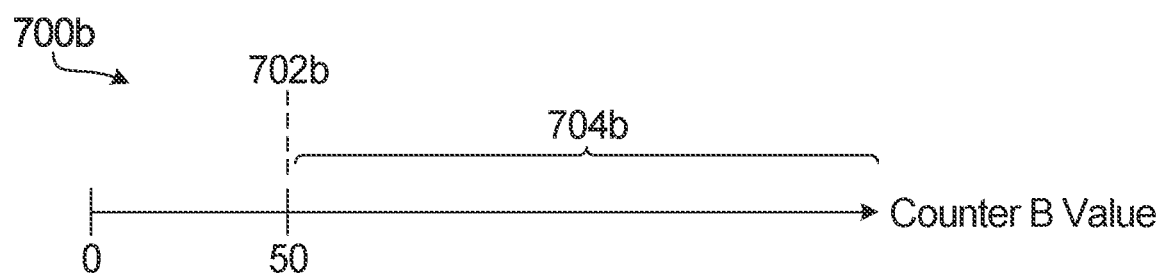
FIG. 4

| E-Commerce Platform | Q Search | JG John's Apparel / Jonny B. Good |
|---|---|---|

| | | All channels ⌄ | Today ⌄ |
|---|---|---|---|

⌂ Home
↪ Orders
◇ Products
○ Customers
⎍ Reports
✦ Discounts
⊞ Apps

SALES CHANNELS ⊕
⊟ Online Store
▢ Mobile App
View all channels

⚙ Settings

Good afternoon, Jonny B.
Here's what's happening with your store today.

Today's total sales    Today's visits
$98.00           1

• Update your Platform Payments tax details
    We require additional information to verify your identity.
    [ Update tax details ]

• Advanced Cash on Delivery has been deactivated for your store
    [ See why ]

TOTAL SALES
$98.00

$125
$75
$25
   12am    8pm    4pm    11pm
                            Jun 1
                         2 orders TOTAL SALES BY CHANNEL    View dashboard
Online Store                    Jun 1
$0.00                              0 orders Mobile app
$0.00                              0 orders Shopify POS (126 York St.)
$0.00                              0 orders

FIG. 7

USING RESOURCE COUNTERS TO LIMIT RESOURCE USAGE MONOPOLIZATION

FIELD

The present application relates to limiting one client of a computing resource from monopolizing or dominating the computing resource.

BACKGROUND

A computing resource may serve multiple clients of that computing resource. Each client may be responsible for performing a respective set of computer-based operations, and some of those operations may require one or more tasks to be executed by the computing resource. For example, a particular client may be responsible for receiving a request from a user, performing a computation and/or database modification based on the request, and sending a reply to the user. The client may need to rely on the computing resource to perform the computation and/or database modification. The client therefore sends, to the computing resource, a task instructing the computing resource to perform the required computation and/or database modification. The computing resource executes the task. In some implementations, the computing resource may send a response back to the client further to such execution, while in others it may not.

The word "client", as used herein, is not meant to be limited to a client in a traditional client-server model, although a traditional client-server model could be utilized if the computing resource happens to be located on a server accessed by the client. Rather, a client, as used herein, refers to any entity (e.g. component of a computing system or platform) that sends a task to a computing resource for execution by that computing resource. Depending upon the scenario, a client might serve multiple users or accounts, such that tasks sent to the computing resource from the client may ultimately be associated with different users or accounts.

SUMMARY

If a client has a large quantity of tasks for execution by a computing resource, and/or the tasks from that client take a long time for the computing resource to execute, then that client may end up monopolizing or dominating the computing resource. For example, other clients served by the computing resource might not have adequate access to the computing resource.

In some embodiments, to try to avoid one client from unduly dominating the computing resource, each client is associated with a respective counter, and the counter is indicative of how much the computing resource has been recently occupied by the client associated with that counter. The counter moves in one direction (e.g. decrements) over time, but moves in the other direction (e.g. increments) in response to the client occupying the computing resource. When the value of the counter is within a particular range (e.g. surpasses a particular threshold), the computing resource is controlled to refrain from executing further tasks from that client until the counter value is no longer within that range (e.g. until the counter value falls back below the threshold), based on instructions provided by at least one processor.

In an embodiment, there is provided a computer-implemented method. The method includes a step of communicating with a plurality of clients to receive tasks from the clients and execute the tasks using a computing resource. The method involves, for a particular client of the plurality of clients, maintaining a counter that changes value in a first direction in response to the computing resource executing a task for the particular client and otherwise changes value in an opposite second direction. In the computer-implemented method, new tasks from the particular client are not executed while the value of the counter is within a particular range.

In some embodiments, a respective counter may be maintained for each client of the plurality of clients. In some embodiments, for each client, the respective counter may change value in the first direction in response to the computing resource executing a respective task for that client and otherwise the respective counter may change value in the opposite second direction. For each client, the method may include the computing resource refraining from executing an outstanding task from that client in response to the value of the respective counter for that client being within a specified range associated with that client.

In some embodiments, where a respective counter may be maintained for each client of the plurality of clients, there may be a first client associated with a first counter and a second client associated with a second counter. In some embodiments, a rate at which the first counter and the second counter changes value in the opposite second direction is different. In some embodiments, a rate at which the first counter and the second counter changes value in the first direction is different. In some embodiments, the specified range associated with the first client and the second client is different.

In some embodiments, the step of communicating may include polling each of the clients to determine whether there is an outstanding task to be executed using the computing resource. In some such embodiments, the particular client is not polled when the value of the counter is within the particular range.

In some embodiments, the counter changing value in the first direction may be incrementing the counter and the counter changing value in the opposite second direction may be decrementing the counter.

In some embodiments, the value of the counter may change in the opposite second direction only when the computing resource is not executing any task for the particular client.

In some embodiments, the counter may change value in the opposite second direction based on the passage of time.

In some embodiments, an amount by which the value of the counter changes in the first direction in response to the computing resource executing the task for the particular client may be offset by an amount dependent upon how much time elapsed during the execution of the task using the computing resource.

In some embodiments, the value of the counter may be within the particular range when the value of the counter passes a threshold value. In some embodiments, the threshold value may be variable.

In some embodiments, the value of the counter may change in the first direction based on at least one of: (i) time occupied by the computing resource while executing tasks for the particular client; (ii) a number of computations performed by the computing resource while executing the tasks for the particular client; or, (iii) a number of data transfers performed by the computing resource while executing the tasks for the particular client.

A system is also disclosed that is configured to perform the methods disclosed herein. For example, the system may include a computing resource to receive and execute tasks from a plurality of clients and a counter associated with the particular client that is used to carry out the method steps.

In another embodiment, there is provided a computer readable medium having stored thereon computer-executable instructions that, when executed by a computer, cause the computer to perform operations of the methods disclosed herein.

BRIEF DESCRIPTION OF THE DRAWINGS

Embodiments will be described, by way of example only, with reference to the accompanying figures wherein:

FIG. 4 illustrates an example of particular ranges of counter values where tasks are executed for clients, according to one embodiment;

FIG. 7 illustrates a home page of an administrator, according to one embodiment.

DETAILED DESCRIPTION

For illustrative purposes, specific example embodiments will now be explained in greater detail below in conjunction with the figures.

A computing resource may be used to execute tasks for a plurality of clients. Each of the clients may serve one or more users, and interactions with the users may result in tasks to be executed by the computing resource. The client may therefore send such tasks to the computing resource for execution.

In some embodiments, clients may send tasks to the computing resource indirectly. For example, in some embodiments, each client may have a dedicated task cue in which to place tasks, which are then pulled by the computing resource for execution. In an implementation, tasks may be sent to an intermediary used to provide a message queue or the like, prior to being pulled by the computing resource for execution.

The users of one particular client may raise a large quantity of new tasks or may raise tasks that take a long time for the computing resource to execute, thereby dominating the computing resource. This may come at the expense of other clients served by the computing resource, e.g. by greatly increasing the wait time for the execution of their tasks. It may be desirable for the computing resource to execute tasks for the clients it serves more equitably by re-prioritizing the tasks of clients that have dominated use of the computing resource.

Figure 1:
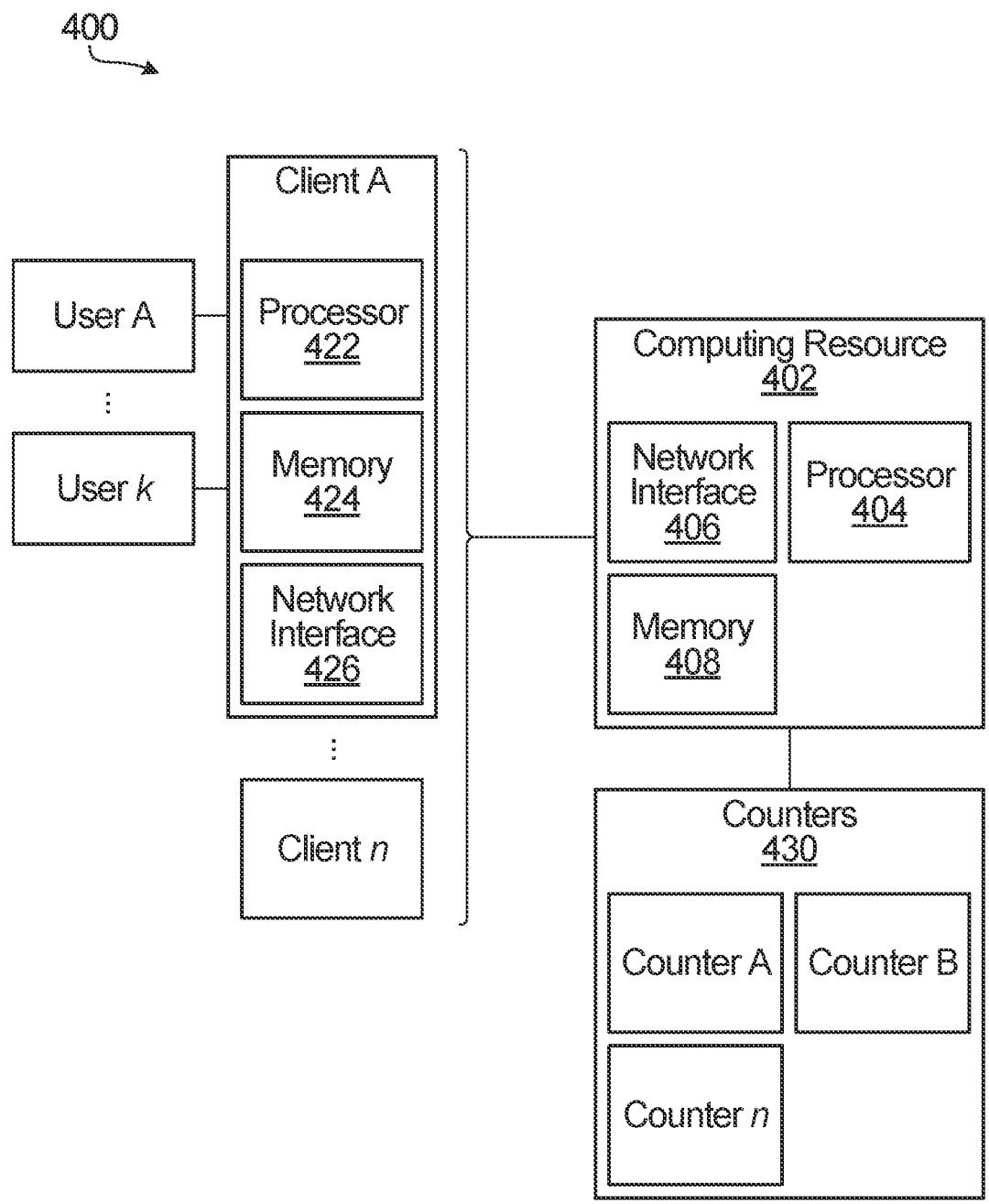
FIG. 1 illustrates a system for limiting a client from dominating a computing resource, according to one embodiment.

FIG. 1 illustrates a system 400 for limiting a client from dominating a computing resource, according to one embodiment. The system 400 includes a computing resource 402, a plurality of clients including Client A to Client n, and counters 430.

The computing resource 402 of system 400 includes a processor 404, a network interface 406, and a memory 408. The processor 404 directly performs, or instructs the computing resource 402 to perform, the operations described herein of the computing resource, e.g., operations such as polling the clients it serves to determine if any of them have new tasks to be executed, executing the clients' tasks, etc. The processor 404 may be implemented by one or more general purpose processors that execute instructions stored in a memory (e.g. in memory 408) or stored in another computer-readable medium. The instructions, when executed, cause the processor 404 to directly perform, or instruct the computing resource 402 to perform the operations of the computing resource described herein. In other embodiments, the processor 404 may be implemented using dedicated circuitry, such as a programmed FPGA, a GPU, or an ASIC.

The network interface 406 is for communicating over a network, e.g. to communicate with clients and/or counters 430 described below. The network interface 406 may be implemented as a network interface card (NIC), and/or a computer port (e.g. a physical outlet to which a plug or cable connects), and/or a network socket, etc., depending upon the implementation. The computing resource 402 further includes a memory 408. A single memory 408 is illustrated in FIG. 1, but in implementation the memory 408 may be distributed.

In some embodiments, the processor 404, memory 408, and/or network interface 406 may be located outside of the computing resource 402.

A plurality of clients may communicate with (e.g. access) the computing resource 402 over a network. For example, a client may have a task to be executed by the computing resource 402, and therefore send the task to the computing resource 402 for execution. For ease of explanation, only a single client, Client A, is shown in detail in FIG. 1. However, it is also illustrated that the computing resource 402 may serve n clients. Each of the n clients may include the same components as illustrated as part of Client A. Client A includes a processor 422, a memory 424, and a network interface 426. The processor 422 directly performs, or instructs Client A to perform, the operations of Client A described herein, e.g. receiving tasks from different users associated with Client A (or generating such tasks based on interactions with the users), and sending tasks to the computing resource 402. The processor 422 may be implemented by one or more general purpose processors that execute instructions stored in a memory (e.g. memory 424) or stored in another computer-readable medium. The instructions, when executed, cause the processor 422 to directly perform, or instruct Client A to perform, the client operations described herein. In other embodiments, the processor 422 may be implemented using dedicated circuitry, such as a programmed FPGA, a GPU, or an ASIC.

The network interface 426 is for communicating over a network, e.g. to communicate with the computing resource 402 and/or users. The network interface 426 may be implemented as a network interface card (NIC), and/or a computer port (e.g. a physical outlet to which a plug or cable connects), and/or a network socket, etc., depending upon the implementation. The memory 424 may be single memory 424 (as illustrated), but in implementation the memory 424 may be distributed. In some embodiments, the processor 422, memory 424, and/or network interface 426 may be located outside of the client.

Client A is shown as serving a plurality of users, including User A to User k. Client A may raise tasks to be executed by the computing resource 402 for any of the users it serves. In some embodiments, Client A may serve only one user. In some embodiments, Client A may not serve any users. In some embodiments, each of the clients of Client A to Client n may serve the same numbers of users or different numbers of users. In some embodiments, two or more clients may serve a same user.

The counters 430 of system 400 may include a plurality of counters, such as Counter A, Counter B, and Counter n. Each of the counters 430 may be associated with a respective one of the clients, including Client A to Client n, served by the computing resource 402. For example, in the embodiments described herein, Counter A is associated with Client A, Counter B is associated with Client B, . . . , and Counter n is associated with Client n. The counters 430 may be embodied as a memory that stores values associated with the use of the computing resource 402 by each client. The counters 430 are illustrated as being in communication with the computing resource 402, and the processor 404 of the computing resource 402 may be used to update the values of the counters 430. In some embodiments, the counters 430 may be part of the computing resource 402, e.g. stored within memory 408.

In some embodiments, the computing resource 402 and each of the clients, such as Client A, may not each include a separate processor. Instead, a single processor (which may be distributed) may implement one, some or all of the clients, and that same single processor might possibly also implement the computing resource 402.

In some embodiments, the computing resource 402 is part of an e-commerce platform, e.g. e-commerce platform 100 described later. However, this is not necessary. The computing resource 402 may, for example, be provided as a stand-alone component or service that is external to an e-commerce platform. In other embodiments, the computing resource 402 may be implemented on or in association with a computer system that is not an e-commerce platform or possibly not even associated with e-commerce.

Limiting a Client from Dominating a Computing Resource

A computing resource may serve n clients, for example, computing resource 402 serves Client A through Client n in system 400. Tasks may be accepted for execution from those clients according to a particular paradigm, e.g. first-in-first-out, in order of task priority, etc.

In one embodiment, each task has an associated priority. When the computing resource, such as computing resource 402, has capacity to accept a new task, the computing resource polls each of the n clients to determine whether any of the n clients have a high priority task to be executed by the computing resource. In some embodiments, the polling operates in a round-robin fashion, in a manner such that each of the n clients has an equal turn for requesting execution of a high priority task. If a client has a high priority task, it is executed, and the polling continues. If the round of polling determines that none of the n clients has a high priority task to be executed, then the polling process repeats, but this time asking whether any of the n clients have a lower priority task to be executed.

If a particular client, such as Client A, of the n clients has a large quantity of high priority of tasks to be executed, then that client may dominate the computing resource 402. Other tasks from other clients B through n, and in particular lower priority tasks, might need to wait an undue amount of time before being executed by the computing resource 402, or might never be executed. The reason a particular client may have a large quantity of high priority tasks to be executed is implementation specific. As one example, Client A may be serving one or more users, including Users A through k, during a period of high demand from those users.

In some embodiments, the following method may be implemented to try to avoid one client from unduly dominating the computing resource.

Each client is associated with a respective counter. For example, Client A in system 400 is associated with Counter A of counters 430. The counter is indicative of how much the computing resource has been recently occupied by the client associated with that counter. The computing resource is said to be "occupied" by a client when the computing resource is executing one or more tasks for that client. The counter increments in response to the client occupying the computing resource. For instance, when the computing resource 402 is executing a task for Client A, the value of Counter A may increment. The unit of incrementation is implementation specific. For example, the counter may be a timer that increments in proportion to the number of milliseconds the computing resource is occupied by a task it executes for the client. However, the counter does not have to be based on time. It may be based on another measurement, e.g. how many computations the computing resource performs for the client's task, and/or how many data transfers the computing resource performs for the client's task, etc.

In the following embodiment explained in detail below, the counters 430 are assumed to be incremented based on (e.g. in proportion to) the amount of time the computing resource 402 spends executing a task for each client. For example, Counter A of the counters 430 is associated with Client A, and Counter B of the counters 430 is associated with a Client B. The computing resource 402 accepts a task from Client A and spends 10 ms completing the task. The Counter A is therefore incremented by an amount based on (e.g. proportional to) 10 ms. For example, the Counter A may be a timer that is incremented 10 ms. The computing resource 402 accepts a task from Client B and spends 5 ms completing the task. The Counter B is therefore incremented by an amount based on (e.g. proportional to) 5 ms. For example, the Counter B may be a timer that is incremented 5 ms. The more often the computing resource 402 is occupied by a given client, the more often the counter for that client is incremented.

Each counter of the counters 430 also decrements at a particular rate. Depending upon the implementation, a particular counter might only decrement when the computing resource 402 is not occupied by the client corresponding to that counter. Alternatively, the counter might always decrement at a particular rate, in which case when the counter is incremented due to the client occupying the computing resource, the value incremented is offset by the corresponding decrement of the counter during that same time period. In any case, the rate at which a counter decrements is not necessarily the same as the rate at which the counter increments when the client occupies the computing resource 402. For example, a 16 ms period of time during which a client, such as Client A, does not occupy the computing resource 402 may translate into the value of Counter A decrementing by 8, whereas a 16 ms period of time during which the Client A occupies the computing resource 402 may translate into an increment of 16. In general, each counter of the counters 430 may decrement at a linear or exponential rate in proportion to the amount of time that has passed. When a client, such as Client A, occupies the computing resource 402, the value of the corresponding counter, such as Counter A, may increment at a linear or exponential rate in proportion to the amount of time that has passed. However, the balance between the rate at which a counter can increment compared to the rate at which the counter decrements is such that the counter grows in value for a client if the client monopolizes or dominates the computing resource 402.

In actual implementation, the counter value is not necessarily continuously updated, but might just be updated at discrete intervals, e.g. upon the occurrence of particular events. As one example, the counter value may be updated upon completion of a task for the client associated with that counter.

If a particular client goes a long time without having a task executed by the computing resource 402, then the counter corresponding to that client will tend towards zero. On the other hand, a client that occupies too much of the computing resource 402 will have its counter grow.

In some embodiments, to ensure a client does not dominate the computing resource 402, the computing resource will not accept a new task from the client if the counter associated with the client is above a particular threshold value.

Figure 2:
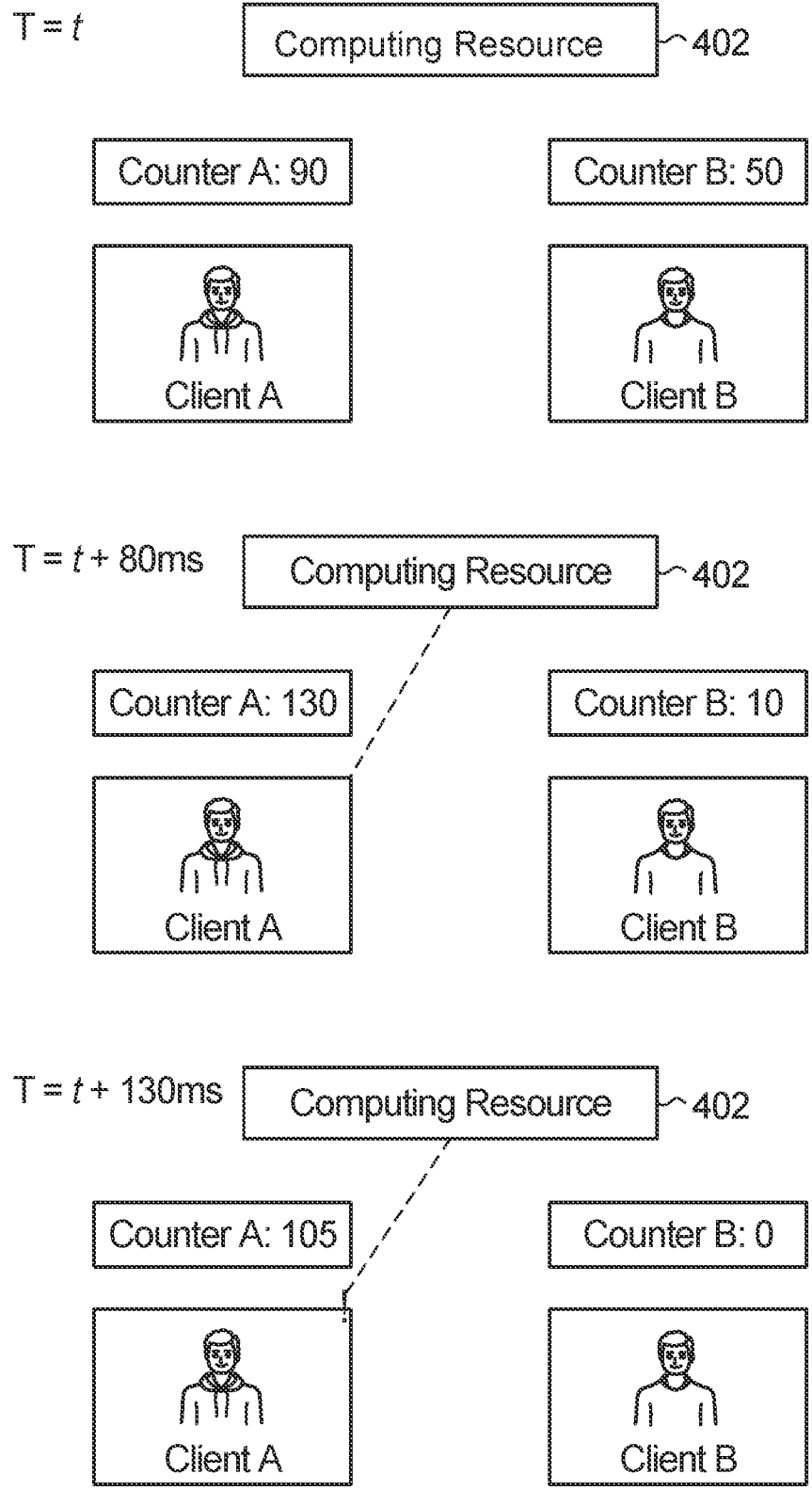
FIGS. 2 and 3 illustrate examples of updating values of counters associated with clients, according to some embodiments.

FIG. 2 illustrates an example of updating values of counters associated with clients, according to one embodiment. Here, the counters are updated at discrete intervals, e.g. in response to events occurring at times T=t, T=t+80 ms, and T=t+130 ms, as explained below.

In FIG. 2, the computing resource is computing resource 402; Client A is Client A of system 400; and, Counter A and Counter B are Counter A and Counter B of the counters 430. Time T=t in FIG. 2 is immediately prior to the polling of Client A by the computing resource 402. The value of Counter A has just been updated. The value of Counter B may also be updated at the same time (although not necessarily, e.g. Counter B may be updated just prior to polling Client B). The value of Counter A is 90 and the value of Counter B is 50. The values of the counters correspond with an amount of time in milliseconds that the associated client has occupied the computing resource 402.

In the example illustrated in FIG. 2, both Counter A and Counter B have a threshold value of 100. The threshold value is the value at which the counter switches between accepting a task for execution for the client and not accepting a task for execution for the client. If Counter A has a value that exceeds 100, then the computing resource 402 will not execute a new task from Client A until Counter A falls below or equal to 100. Similarly, if Counter B has a value that exceeds 100, then the computing resource 402 will not execute a new task from Client B until Counter B falls below or equal to 100.

Following T=t, Client A is polled by the computing resource 402 and requests the execution of a task. The value of Counter A is below 100, and the computing resource 402 is available to accept the task for execution, and so it is executed. The process of polling Client A and executing the resulting task for Client A takes 80 ms total. This is illustrated in FIG. 2 at the time T=t+80 ms, where the task for Client A has finished being executed and the value of Counter A has been updated to be 130. As the polling and execution of the task for Client A require the use of the computing resource 402 for 80 ms, this results in incrementing the value of Counter A by 80. However, assuming Counter A decrements at a rate of 1 per 2 ms, then the value of Counter A also decrements by 40 during that 80 ms window. Hence, after the task has been executed at T=t+80 ms, the value of Counter A is updated as 90+80−40=130.

In the embodiment illustrated by FIG. 2, Counter B also decrements at the same rate as Counter A, i.e. 1 per 2 ms. The value of Counter B decrements by a value of 40 during the 80 ms window in which Client A is polled and its task is executed. Therefore, the value of Counter B at T=t+80 ms is 10.

At T=t+130 ms in FIG. 2, the value of Counter A is updated just prior to the computing resource 402 polling Client A again. Although not necessary, Counter B may also be updated at the same time, as illustrated (if Counter B is not updated at this point it may be updated just prior to computing resource 402 polling Client B). The computing resource 402 polls Client A 50 ms following the completion of the previous task to determine whether Client A has a new task for the computing resource 402 to execute. Just prior to polling Client A, the value of Counter A is decremented by a value of 25 (corresponding to the 50 ms that have passed since the last update), and the updated value of Counter A is 130−25=105. As the value of Counter A at T=t+130 ms is 105, the threshold value of 100 is exceeded. Therefore, the computing resource 402 does not execute the new task for Client A until enough time has elapsed such that the value of Counter A falls below 100, i.e. at least 10 ms more have passed.

In some embodiments, Client A might not be polled by the computing resource 402 at T=t+130 ms based on the fact that the updated value of Counter A is greater than the threshold value 100.

Assuming Counter B is also updated, the value of Counter B at T=t+130 ms is 0. In FIG. 2, Client B does not have a new task to be executed by the computing resource at any time between T=t and T=t+130 ms, or if Client B does have a task, it has not yet had the opportunity during that time window to have the task executed. Therefore, the value of Counter B decrements steadily at the rate of 1 per 2 ms. In this embodiment, the values of the counters are positive integer values. Since the value of Counter B at T=t is 50, and Counter B would have decremented by 65 during this time period, the value of Counter B is 0 from T=t+100 ms until the computing resource executes another task for Client B.

Alternatively, in some embodiments, the value of the counters may be either positive or negative integer values, e.g. in the example immediately above Counter B may be a negative value at time T=t+130 ms.

In some embodiments, a computing resource 402 will not accept/avoids accepting a new task from a client if the client's counter exceeds a particular threshold as follows. At each point in time at which the computing resource 402 would normally poll a client to determine if the client has any new task to be executed, the computing resource first updates the value of the counter corresponding to that client as necessary, and then compares the counter value to the threshold value. If the counter value exceeds the threshold value, then the computing resource 402 skips polling that client in that round of polling. For example, in FIG. 2, the computing resource 402 would skip polling Client A at T=t+130, as the value of Counter A is greater than the threshold value of 100. In another embodiment, the process of polling may occur without regard to the counter value, but when polling reveals that a particular client has a new task to be executed, the value of the counter for that client is first checked/inspected before accepting the new task. If the value of the counter exceeds the threshold, the new task is not accepted in that round of polling.

Through the use of the threshold, it is unlikely that a single client may dominate the computing resource 402. Whenever a particular client has occupied the computing resource 402 to an extent such that its counter exceeds the threshold, the client is denied the computing resource 402 until the counter drops below the threshold. Within the window of time during which the client is denied the computing resource 402, the computing resource 402 is available to accept a task from a different one of the clients having a counter value that does not exceed its threshold. For example, if Counter A exceeds 100, and Client A has a new task for execution by the computing resource 402, the computing resource 402 does not execute Client A's new task, but instead polls other clients. If Client B has a new task for execution, it may instead be accepted and executed. In some embodiments, Client A's new task may be executed by the computing resource 402 even if the Counter A exceeds its threshold when none of the other clients served by the computing resource have tasks awaiting execution.

In the embodiments described above in relation to FIG. 2, Counter A is not updated continually, but instead at discrete intervals, e.g. at times T=t, T=t+80 ms, and T=t+130 ms. Alternatively, Counter A might be continually updated at a predefined frequency, e.g. once every one or two milliseconds. In one embodiment, Counter A may count down at a particular clock rate (e.g. at a rate equivalent to 1 unit every 2 ms), and may be incremented at another clock rate (e.g. at a rate equivalent to 1 unit every 1 ms) when the computing resource 402 is executing a task from Client A. Similar remarks apply to the other counters.

In the embodiments described above in relation to FIG. 2, a counter decrements over time and increments in response to a task being executed for a client associated with the counter. The directions "increment" and "decrement" are implementation-specific. The counter could increment over time and decrement in response to a task being executed for a client associated with that counter, in which case the threshold value may need to be modified to adapt to such an implementation. More generally, a counter changes value in a first direction in response to the computing resource executing a task for the client associated with that counter, and otherwise the counter changes value in an opposite second direction.

In some embodiments, a particular client may be prioritized by: (i) changing the rate at which its counter decrements, and/or (ii) changing the rate at which its counter increments, and/or (iii) by establishing a higher threshold for that client compared to other clients. In this way, it may be possible to provide preferable access to the computing resource 402 for certain clients, e.g. for clients serving premium users.

Figure 3:
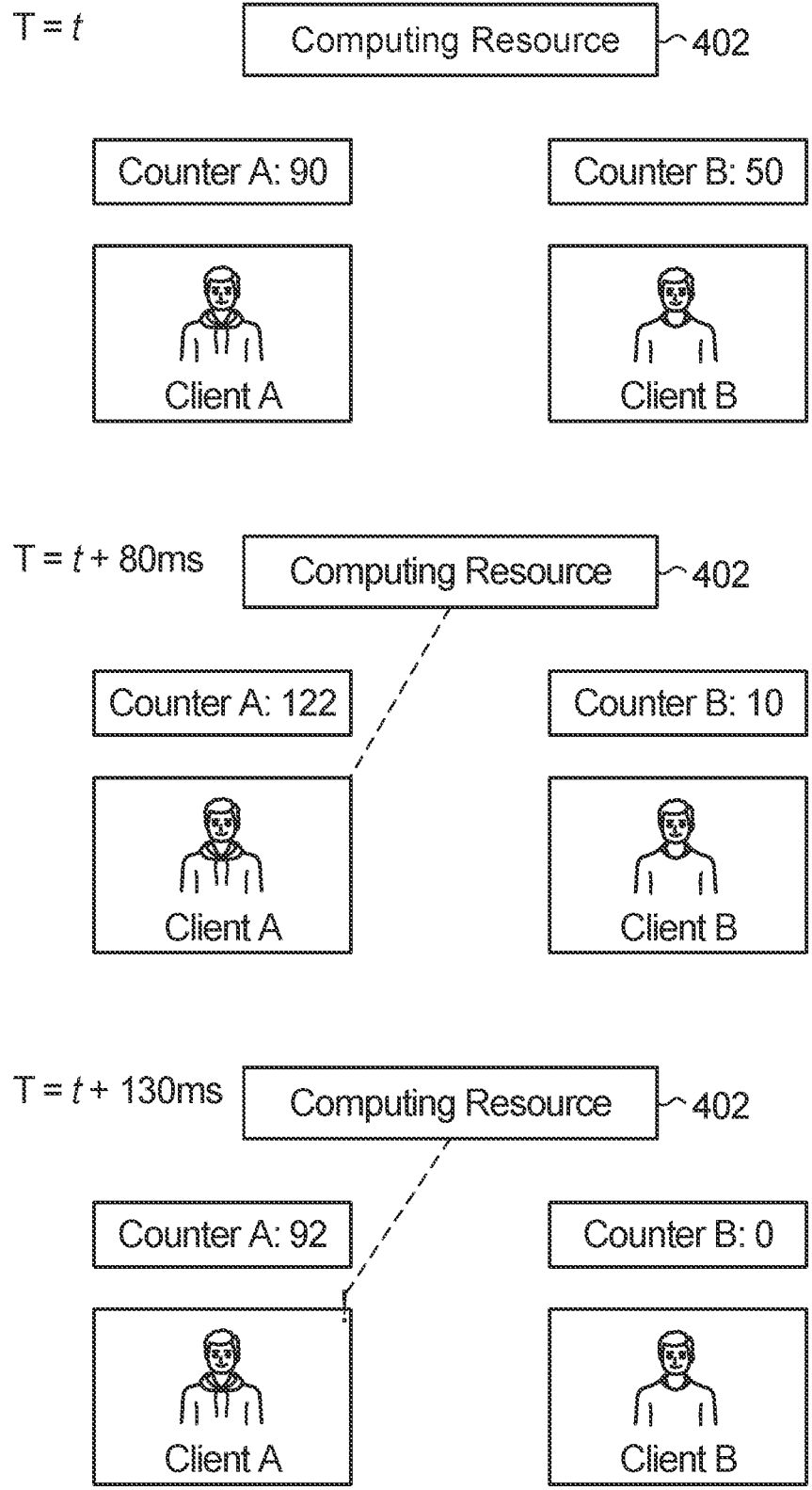

As an example, Client A may be prioritized over Client B by having Counter A decrement at a rate faster than Counter B. This is illustrated in FIG. 3, which illustrates updating values of counters that decrement at different rates, according to one embodiment. FIG. 3 is similar to FIG. 2, however the value of Counter A decrements at a rate of 3 per 5 ms, and Counter B decrements at a rate of 1 per 2 ms. Like in FIG. 2, time T=t is immediately prior to the polling of Client A by the computing resource 402. The value of Counter A is 90 and the value of Counter B is 50.

Immediately following T=t, the computing resource 402 polls Client A, which requests the execution of a task. The value of Counter A is below 100, and the computing resource 402 is available to accept the task for execution, and so it is executed. The polling and subsequent execution of the task for Client A occupies the computing resource for 80 ms total. This is offset by the decrement of Counter A by 3 every 5 ms (equal to a decrement of 48 over 80 ms). The value of Counter A is therefore updated as 90+80−48=122. The value of Counter B at T=t+80 ms is 10, as 80 ms have elapsed and Counter B decrements at a rate of 1 per 2 ms. Therefore, Counter B is updated as 50−40=10.

At T=t+130 ms in FIG. 3, the value of Counter A is updated just prior to the computing resource 402 again polling Client A, which occurs 50 ms following the completion of the previous task. Counter B may also be updated, as illustrated. Over the 50 ms, Counter A has been decremented by 3 every 5 ms (equal to a decrement of 30 over 50 ms). The value of Counter A is therefore updated as 122−30=92, which does not exceed the threshold of 100. As the value of Counter A falls within the range at which the computing resource 402 accepts a new task from Client A, the computing resource 402 will poll Client A. Assuming Client A has a new task, the computing resource 402 will execute the new task. Like in FIG. 2, the value of Counter B falls to 0 due to the lack of time occupied by the computing resource 402 by Client B between T=t and T=t+130 ms.

As another example, Client A may be prioritized over Client B by setting the threshold value for Counter A associated with Client A to be higher than the threshold value for Counter B associated with Client B. FIG. 4 provides an example of particular ranges of counter values where tasks are executed for clients, according to one embodiment. In FIG. 4, 700a is a number line for values of Counter A and 700b is a number line for values of Counter B.

For number line 700a corresponding with Counter A, the threshold value is 100, as indicated by the dashed line 702a. At any value of Counter A that is less than or equal to the threshold value, i.e. 0 to 100, the computing resource will execute a new task for Client A. If the value of Counter A falls within range 704a, which exceeds the threshold value 702a, the computing resource will not execute any new tasks for Client A. In some embodiments, the computing resource 402 will not poll Client A when the value of Counter A falls within range 704a.

For number line 700b corresponding with Counter B, the threshold value is 50, as indicated by the dashed line 702b. If the value of Counter B falls within range 704b, i.e. any value exceeding the threshold value of 50, the computing resource 402 will not execute any new tasks for Client B, and may not poll Client B in some embodiments.

In FIG. 4, the threshold value of Counter A 702a is greater than the threshold value of Counter B 702b, and hence the range in which the computing resource 402 will not execute tasks for Client B 704b is greater than the range for Client A 704a. As a result, there is a greater operating area for Client A than Client B. If the rate of incrementing and decrementing the counters are the same, the computing resource 402 may be able to execute tasks for Client A at a greater frequency than for Client B, hence prioritizing Client A over Client B.

In some embodiments, the threshold value may be static, e.g. set as the absolute value 100 for Client A and rarely or never modified. In other embodiments, the threshold value may dynamically vary. For example, the threshold value for a client may be a function of the percentage of time that client has occupied the computing resource. This may, for instance, have the result of dynamically lowering the threshold value during the initial period when the client or computing resource first comes online. For example, the threshold value for a particular client may be set as whatever value is necessary to prevent that client from occupying more than 10% of the computing resources over a given period of time (e.g. since the computing resource came online). This may result in the threshold value dynamically lowering if the client first comes online and immediately begins trying to continually occupy the computing resource. For example, the threshold value for Counter A may dynamically lower to a smaller value (e.g. 15) when Client A first comes online, but eventually settle at the value 100 after a steady state is reached. In some embodiments, the threshold value may be a hybrid of dynamic and static, e.g. the threshold value may vary dynamically in the manner explained above, except the threshold value may be limited to movement within a particular range and may, for example, stay static on the bottom of that range when the client first comes online.

Embodiments above are directed to implementations in which each client is associated with a respective counter, and the value of the counter determines whether a new task will be executed for the client associated with that counter. A few alternative implementations are outlined below.

In some embodiments, the computing resource 402 is configured to spend no more than a particular maximum amount of time executing tasks from a same client in a particular window of time. For example, over a period of X seconds the computing resource 402 is available to spend maximum Y<X seconds accepting and processing tasks from Client A. Once the threshold of Y seconds is reached, the computing resource 402 will not accept any more tasks from Client A in the window. The window of time may be a running window, e.g. counting back X seconds from the current time.

In other embodiments, the computing resource 402 is configured to accept no more than a particular maximum number of tasks from a same client. Once the maximum number of tasks from a client is reached, the computing resource does not accept any more tasks from that client until a certain condition is met. For example, this condition may be the passage of a particular amount of time and/or the number of tasks executed for other clients reaches a threshold, etc.

In some embodiments, multiple thresholds may be used to determine the likelihood that a task may be accepted for execution by the computing resource 402. Each threshold may have a different threshold value, and when a client's counter exceeds each threshold value, the likelihood that the client's task will be accepted for execution may decrease. For example, three threshold values may be set to determine if computing resource 402 accepts tasks from Client A. The first threshold value may be set to 100, the second threshold value may be set to 110, and the third threshold value may be set to 120. If Counter A associated with Client A has a value exceeding the first threshold value of 100, but is less than the second threshold value of 110, there may be a 50% chance that the computing resource 402 rejects a new task from Client A. If Counter A has a value exceeding the second threshold value of 110, but is less than the third threshold value of 120, there may be a 75% chance that the computing resource 402 rejects a new task from Client A. Lastly, if Counter A has a value exceeding the third threshold value, the computing resource 402 will reject all tasks from Client A until the value of Counter A falls below the third threshold value.

Example Methods

Figure 5:
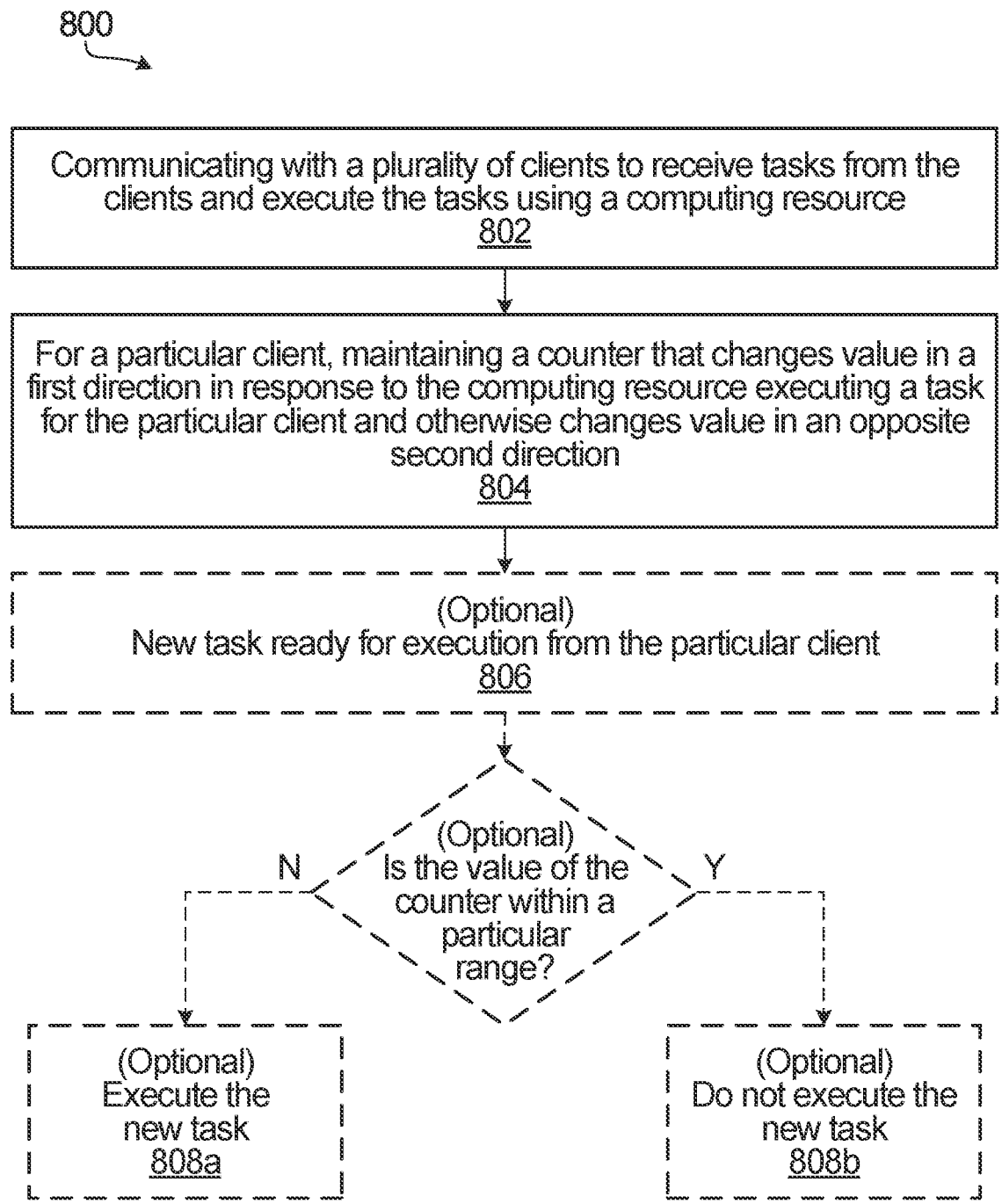
FIG. 5 illustrates steps of a computer-implemented method, according to one embodiment.

FIG. 5 illustrates a computer-implemented method 800, according to one embodiment. Not all of the steps in the method 800 of FIG. 5 are necessary in all embodiments. Also, some of the steps may be substituted by other steps instead. The method may be performed by or on an e-commerce platform, such as e-commerce platform 100 described later, although this is not necessary. In method 800, the steps are described as being performed by the processor 404 of computing resource 402 of FIG. 1, but this is only an example. For example, the method 800 may instead be performed by another entity, which might or might not be part of an e-commerce platform. In one alternative example, some of the steps of the method 800 may be performed by an entity separate from the computing resource 402. For example, polling and/or checking/updating a counter and/or deciding whether to execute a task may be performed by another entity (e.g. another processor) separate from the computing resource 402 itself. The computing resource 402 might be limited to just executing received tasks.

At step 802, the processor 404 communicates with a plurality of clients to receive tasks from the clients and execute the tasks using a computing resource 402. The computing resource 402 may interact with the clients it serves, including Client A to Client n of FIG. 1. The communicating may involve polling the clients in order to determine if the clients have new tasks for the computing resource 402 to execute. If one of the clients has a new task to be executed, the computing resource 402 may execute the task.

At step 804, for a particular client of the plurality of clients, the processor 404 may maintain a counter that changes value in a first direction in response to the computing resource 402 executing a task for the particular client and otherwise changes value in an opposite second direction. For example, a particular client may be Client A, and the associated counter may be Counter A of counters 430 in FIG. 1. Changing value in the first direction may be incrementing the value of the counter, and changing value in the opposite second direction may be decrementing the value of the counter. Counter A increments when computing resource 402 is used to execute a task for Client A. In FIG. 2, Counter A has a value of 90 at T=t, and Client A occupies the computing resource 402 in the 80 ms between T=t and T=t+80 ms. At the end of this time window, the value of Counter A has incremented to the value of 130. After an additional 50 ms have elapsed, at T=t+130 ms, Counter A has changed value in the second opposite direction such that it has decremented to 105.

New tasks from the particular client are not executed while the value of the counter is within a particular range. At optional step 806 of method 800, a new task may be ready for execution from a particular client. For example, at T=t+130 ms in FIG. 2, Client A may have a new task to be executed by the computing resource.

The processor 404 of the computing resource 402 then determines if the value of the counter of the particular client falls within a particular range. A particular range may include values that exceed a particular threshold value. If the value of the counter does not fall within a particular range, the processor 404 may execute the new task, as shown at optional step 808a. Alternatively, if the value of the counter falls within the particular range, the processor 404 might not execute the new task, as shown at optional step 808b. Examples are described earlier, e.g. in relation to FIG. 4. In FIG. 4, the number line 700a of Counter A values has a threshold value 702a of 100, and a particular range 704a. For T=t+130 ms in FIG. 2, the value of Counter A is 105, which exceeds threshold 702a and falls within the particular range 704a. The computing resource 402 does not execute a new task raised by Client A when the value of Counter A falls within range 704a.

In some embodiments, a respective counter is maintained for each client of the plurality of clients. For each client, the respective counter changes value in the first direction in response to the computing resource executing a respective task for that client and otherwise changes value in the opposite second direction. As well, for each client, the computing resource refrains from executing an outstanding task from that client in response to the value of the respective counter for that client being within a specified range associated with that client. For example, system 400 of FIG. 1 includes a plurality of clients, including Client A to Client n, and corresponding counters 430 that include Counter A to Counter n. FIGS. 2 and 3 include a computing resource 402 serving at least Client A and Client B, which are associated with Counter A and Counter B, respectively. At T=t+80 ms in FIG. 2, the value of Counter A changes value in a first direction, i.e. increments, after the computing resource 402 executes the task for Client A. The values of both Counter A and Counter B change value in an opposite second direction, i.e. decrement, at T=t+130 ms when the computing resource 402 is not executing tasks for these clients. When the value of Counter A or Counter B fall within their respective particular ranges, such as 704a and 704b respectively of FIG. 4, outstanding tasks from Client A and Client B may not be executed by the computing resource 402.

In some embodiments, where a respective counter is maintained for each client of the plurality of clients, a first client of the plurality of clients is associated with a first counter and a second client of the plurality of clients is associated with a second counter. A rate at which the first counter and the second counter changes value in the opposite second direction may be different, and/or a rate at which the first counter and the second counter changes value in the first direction may be different, and/or the specified range associated with the first client and the second client may be different.

For instance, Counter A is maintained for Client A and Counter B is maintained for Client B. In one implementation, Counter A may decrement at a rate of 3 per 5 ms and Counter B may decrement at a rate of 1 per 2 ms, as shown in FIG. 3. At T=t+130 ms in FIG. 3, the computing resource 402 has not been used by Client A for 50 ms (i.e., since T=t+80 ms). In this window of time, Counter A has decremented by 30. Conversely, in the same window of time, the value of Counter B would decrement by 25 if it had not reached zero. This is an example of one counter (Counter A) changing value in the opposite second direction at a faster rate than another counter (Counter B), where the opposite second direction in this example is decrementing. In this way, Client A is prioritized over Client B. In another implementation, Counter B could change in the first direction (e.g. increment) faster than Counter A, thereby providing prioritization to Client A.

In another implementation, the specified range associated with Client A is different than the specified range associated with Client B. For example, FIG. 4 shows a particular range 704a in which the computing resource 402 does not execute tasks for Client A. Range 704a is less restrictive, i.e. smaller, than the particular range 704b in which the computing resource does not execute tasks for Client B. Client A is therefore prioritized over Client B.

In some embodiments, the communicating step 802 may include polling each of the clients to determine whether there is an outstanding task to be executed using the computing resource 402. In some of such embodiments, the particular client is not polled if the value of the counter is within the particular range. For example, the computing resource 402 may poll the clients, including Client A through Client n, to determine whether there is a new task to be executed. The value of Counter A associated with Client A may exceed the threshold value 702a of 100 and fall within range 704a of FIG. 4. The computing resource 402 may therefore skip polling Client A for new tasks until the value of Counter A is no longer in the particular range 704a.

In some embodiments, the counter changing value in the first direction at step 804 is incrementing the counter and the counter changing value in the opposite second direction at step 804 is decrementing the counter. For example, in FIG. 2, the value of Counter A is shown to increment in the time window between T=t and T=t+80 ms, when the computing resource 402 is occupied by Client A. Conversely, the value of Counter A is shown to decrement in the time window between T=t+80 ms and T=t+130 ms when Client A is not occupying the computing resource 402.

In some embodiments, the value of the counter changes in the opposite second direction at step 804 only when the computing resource is not executing any task for the particular client. For instance, the opposite second direction may be decrementing the value of a counter. In FIGS. 2 and 3, the value of Counter A is shown to decrement in the time window between T=t+80 ms and T=t+130 ms when the computing resource 402 is not executing a task for Client A. Likewise, in the same time window, Counter B also decrements as the computing resource 402 is also not executing a task for Client B.

In some embodiments, the counter changing value in the opposite second direction at step 804 is based on the passage of time. For instance, Counter A changes value in the second direction, i.e. decrements, at a rate proportional to the amount of time that has passed in which the computing resource 402 is not executing a task for Client A. In FIG. 2, the value of Counter A has been decremented from 130 to 105 for 50 ms at a rate of 1 per 2 ms between T=t+80 ms and T=t+130 ms.

In some embodiments, an amount by which the value of the counter changes in the first direction in response to the computing resource executing the task for the particular client at step 804 is offset by an amount dependent upon how much time elapsed during the execution of the task using the computing resource. For example, the computing resource 402 polls and executes a task for Client A between T=t and T=t+80 ms in FIG. 2. At T=t, the value of Counter A associated with Client A is 90. The computing resource 402 is occupied by Client A for 80 ms, the rate at which Counter A increments is 1 per 1 ms, and the rate at which Counter A decrements based on time is 1 per 2 ms. Therefore, the value of Counter A is calculated as 90 (i.e. the starting value)+80 (i.e. the amount of time the computing resource 402 polls and executes the task for Client A)−40 (i.e. the offset value based on the amount of time elapsed).

In some embodiments, the value of the counter is within the particular range when the value of the counter passes a threshold value. For example, the threshold value of Counter A may be threshold value 702a of FIG. 4 (which is 100 in the example), and any value exceeding the threshold may fall within particular range 704a shown on number line 700a. In some embodiments, the threshold value may be variable. For example, the threshold value of 100 in FIG. 4 might not be fixed, and may vary in part as a function of the percentage of time that client has occupied the computing resource.

In some embodiments, the value of the counter changes in the first direction at step 804 based on at least one of: (i) time occupied by the computing resource while executing tasks for the particular client (like in FIG. 2); (ii) a number of computations performed by the computing resource while executing the tasks for the particular client; or, (iii) a number of data transfers performed by the computing resource while executing the tasks for the particular client. For example, in FIGS. 2 and 3, the value of Counter A changes in a first direction, i.e. increments, based on the amount of time the computing resource 402 is occupied by Client A. In an alternative example, the value of Counter A may increment proportionally to the number of data transfers or computations performed by the computing resource 402 in order to execute a task for Client A.

In some embodiments, a system is provided for performing the methods described above. The system may include a computing resource (e.g. computing resource 402) to receive and execute tasks from a plurality of clients (e.g. Client A through Client n of FIG. 1). The system may also include a counter associated with a particular client of the plurality of clients, (e.g., Counter A of counters 430 associated with Client A) to change value in a first direction in response to the computing resource executing a task for the particular client and otherwise to change value in an opposite second direction (e.g. Counter A may increment when the computing resource 402 is executing a task for Client A and decrement otherwise). The computing resource of the system is configured not to execute new tasks from the particular client while the value of the counter is within a particular range.

In some embodiments, a computer-readable medium is provided having stored thereon computer-executable instructions that, when executed by a computer, cause the computer to perform method steps described above, e.g. in relation to FIG. 5.

An Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 6:
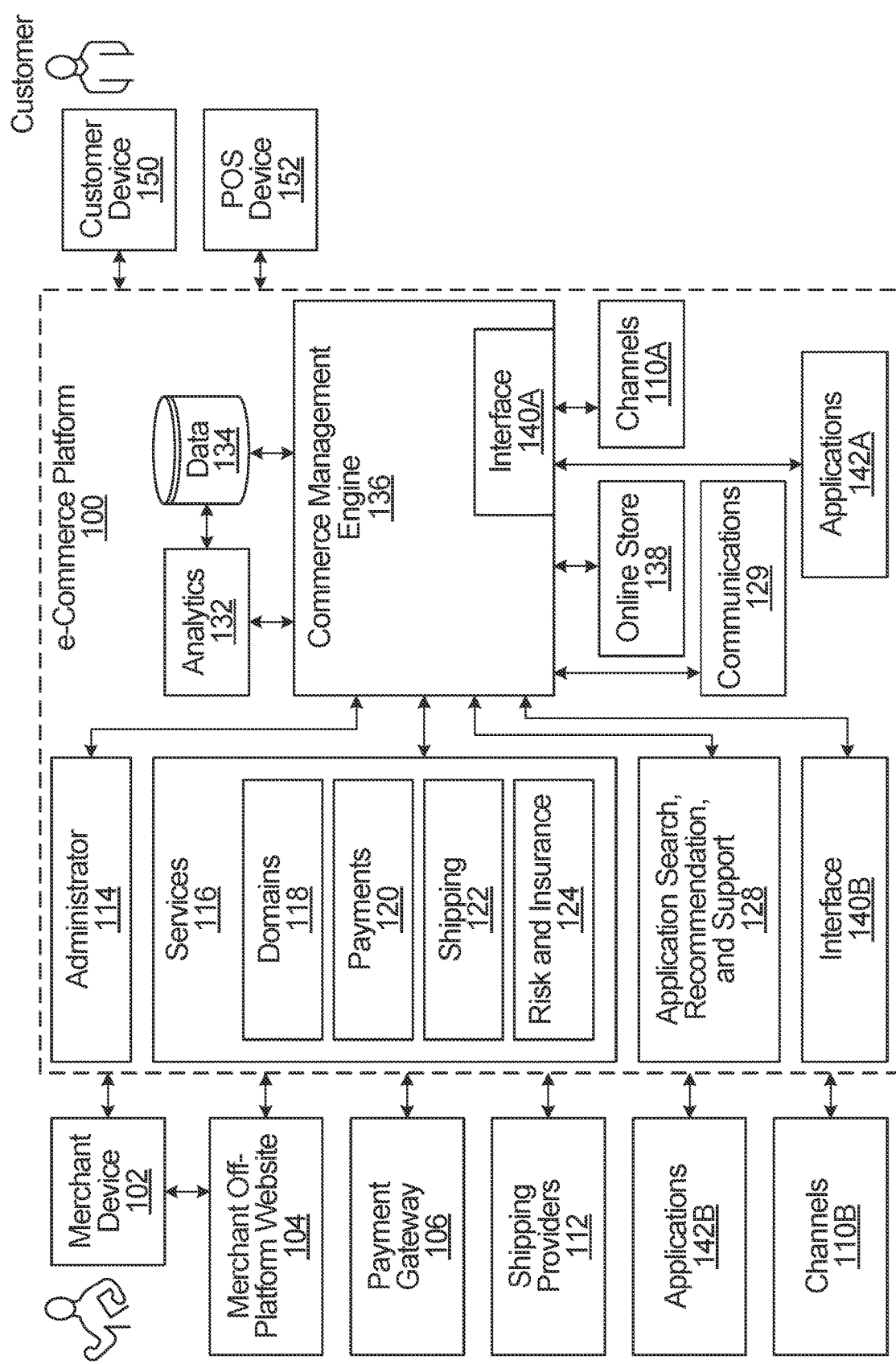
FIG. 6 is a block diagram of an e-commerce platform, according to one embodiment.

FIG. 6 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 6, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 7 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 7. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 6, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Limiting a Client from Dominating a Computing Resource in the E-Commerce Platform 100

Figure 8:
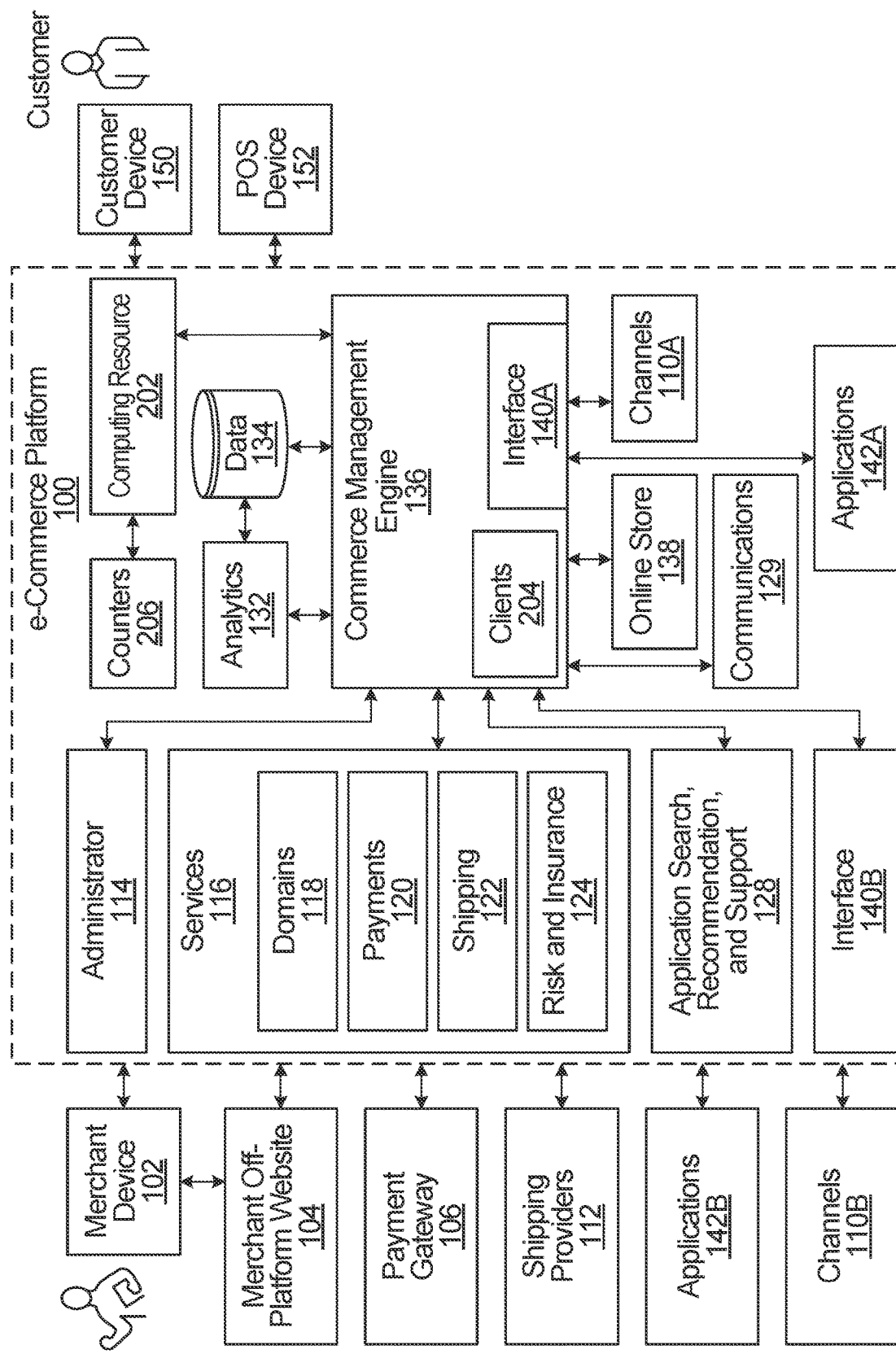
FIG. 8 illustrates the e-commerce platform of FIG. 6, but with a client and a computing resource, according to one embodiment.

In one example of the system of FIG. 1, in the context of e-commerce platform 100, each user may be a merchant device 102 and/or customer device 150. In this context, a client is a component of the e-commerce platform 100 that is responsible for processing requests and performing operations (e.g. computations, database modifications, etc.). In some embodiments, the client may serve a group of merchant accounts. FIG. 8 illustrates the e-commerce platform 100 of FIG. 6, but with the additions of a computing resource 202, clients 204, and counters 206. The computing resource 202 may be computing resource 402 of the system FIG. 1, the clients 204 may be Client A through Client n of the system of FIG. 1, and counter 206 may be Counters 430 of the system of FIG. 1.

The computing resource 202 performs the methods for limiting any one of the clients 204 from dominating the computing resource 202, as disclosed herein. For example, the computing resource 202 may refrain from executing a new task for one of the clients 204, e.g. based on a value of one of the counters 206 associated with the client, as described herein. In some embodiments, the computing resource 202 may execute a task for one of the clients 204 if the value of its associated counter falls outside of a particular range, e.g. as described herein. In some embodiments, the computing resource 202 may interact directly with a data store, e.g. data 134.

The computing resource 202 may be implemented by one or more general-purpose processors that execute instructions stored in a memory or stored in another non-transitory computer-readable medium. The instructions, when executed, cause the computing resource 202 to perform the operations of the computing resource 202, e.g., operations relating to executing tasks and operations relating to the prevention of any one of the clients 204 from dominating the use of the computing resource 202 at the expense of the other clients. Alternatively, some or all of the computing resource 202 may be implemented using dedicated circuitry, such as an application specific integrated circuit (ASIC), a graphics processing unit (GPU), or a programmed field programmable gate array (FPGA). In some embodiments, the computing resource 202 may be located externally to the e-commerce platform 100.

The clients 204 of the e-commerce platform 100 of FIG. 8 may be embodied as part of the commerce management engine 136. Each one of the clients 204 may be implemented by one or more general-purpose processors that execute instructions stored in a memory or stored in another non-transitory computer-readable medium. The instructions, when executed, cause a particular client 204 to perform the operations of the client 204, e.g., operations relating to raising a new task to be executed by the computing resource 202. Alternatively, some or all of the clients 204 may be implemented using dedicated circuitry, such as an ASIC, a GPU, or a programmed FPGA. In some embodiments, the clients 204 may be located inside the e-commerce platform 100 but external to, and optionally coupled to, the commerce management engine 136. In some embodiments, the clients 204 may instead be located externally to the e-commerce platform 100 and possibly coupled to the commerce management engine 136.

Each of the counters 206 of the e-commerce platform 100 of FIG. 8 may be associated with a respective client of clients 204. The counters 206 may provide values to the computing resource 202 that are reflective of the use of the computing resource 202 by each of the clients 204 in the manner described herein. In some embodiments, the counters 206 may be part of the computing resource 202. In some embodiments, the counters 206 may instead be located externally to the e-commerce platform 100 and coupled to the computing resource 202. The counters 206 may be implemented using memory. As one example, each one of the counters may be a register.

Although the computing resource 202, clients 204, and counters 206 in FIG. 8 are each illustrated as a distinct component of the e-commerce platform 100, this is only an example. The computing resource 202, clients 204, and/or counters 206 could also or instead be provided by another component residing within the e-commerce platform 100 or external to the e-commerce platform 100. In some embodiments, either or both of the applications 142A-B may provide the clients 204, the counters 206, and/or a computing resource 202 that implements the functionality described herein. In some implementations, the clients 204, the counters 206, and/or the computing resource 202 is provided at least in part by an e-commerce platform, either as a core function of the e-commerce platform or as an application or service supported by or communicating with the e-commerce platform.

Although the embodiments described previously may be implemented within e-commerce platform 100, the embodiments are not limited to the specific e-commerce platform 100 of FIGS. 6 to 8 and could be used in connection with any e-commerce platform. Also, the embodiments described previously need not necessarily be implemented in association with an e-commerce platform, but might instead be implemented as a standalone component or service.

Furthermore, the embodiments described previously are not limited to e-commerce applications and may be implemented on or in association with a computer system that is not an e-commerce platform and/or that is not even associated with e-commerce. There are many applications having no relation to e-commerce in which a computing resource serves clients of that computing resource, and in which it is desired to prevent one of the clients from dominating the computing resource.

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:
communicating with a plurality of clients to receive tasks from the clients and execute the tasks using a computing resource; and
for a particular client of the plurality of clients, maintaining a counter that changes value in a first direction in response to the computing resource executing a task for the particular client and otherwise changes value in an opposite second direction;
wherein an amount by which the counter changes during or after execution of the task in response to the computing resource executing the task is based on how much of the computing resource was occupied during execution of the task;
wherein new tasks from the particular client are not executed while the value of the counter is within a particular range; and
wherein the amount by which the value of the counter changes in the first direction in response to the computing resource executing the task for the particular client is offset by an amount stored in a second counter indicative of how much time elapsed during the execution of the task using the computing resource.

2. The computer-implemented method of claim 1, wherein a respective counter is maintained for each client of the plurality of clients, wherein for each client, the respective counter changes value in the first direction in response to the computing resource executing a respective task for that client and otherwise changes value in the opposite second direction; and
wherein for each client, the computing resource refrains from executing an outstanding task from that client in response to the value of the respective counter for that client being within a specified range associated with that client.

3. The computer-implemented method of claim 2, wherein a first client of the plurality of clients is associated with a first client counter, wherein a second client of the plurality of clients is associated with a second client counter, and wherein at least one of:
a rate at which the first client counter and the second client counter change value in the opposite second direction is different;
a rate at which the first client counter and the second client counter change value in the first direction is different; or,
the specified range associated with the first client and the second client is different.

4. The computer-implemented method of claim 1, wherein the communicating comprises polling each of the clients to determine whether there is an outstanding task to be executed using the computing resource, and wherein the particular client is not polled when the value of the counter is within the particular range.

5. The computer-implemented method of claim 1, wherein the counter changing value in the first direction is incrementing the counter and the counter changing value in the opposite second direction is decrementing the counter.

6. The computer-implemented method of claim 1, wherein the value of the counter changes in the opposite second direction only when the computing resource is not executing any task for the particular client.

7. The computer-implemented method of claim 1, wherein the value of the counter is within the particular range when the value of the counter passes a threshold value, wherein the threshold value is variable.

8. The computer-implemented method of claim 1, wherein the value of the counter changes in the first direction based on at least one of:
(i) time occupied by the computing resource while executing tasks for the particular client;
(ii) a number of computations performed by the computing resource while executing the tasks for the particular client; or,
(iii) a number of data transfers performed by the computing resource while executing the tasks for the particular client.

9. A system comprising:
a computing resource comprising one or more processors configured to receive and execute tasks from a plurality of clients; and,
a counter associated with a particular client of the plurality of clients, the counter to change value in a first direction in response to the computing resource executing a task for the particular client and otherwise to change value in an opposite second direction,
wherein an amount by which the counter changes during or after execution of the task in response to the computing resource executing the task is based on how much of the computing resource was occupied during execution of the task;
wherein the computing resource is configured not to execute new tasks from the particular client while the value of the counter is within a particular range; and
wherein the amount by which the value of the counter changes in the first direction in response to the computing resource executing the task for the particular client is offset by an amount stored in a second counter indicative of how much time elapsed during the execution of the task using the computing resource.

10. The system of claim 9, further comprising a plurality of counters, each client of the plurality of clients associated with a respective counter of the plurality of counters, wherein for each client, the respective counter is configured to change value in the first direction in response to the computing resource executing a respective task for that client and otherwise to change value in the opposite second direction; and,
wherein for each client, the computing resource is configured to refrain from executing an outstanding task from that client in response to the value of the respective counter for that client being within a specified range associated with that client.

11. The system of claim 10, wherein the plurality of counters comprises a first client counter associated with a first client of the plurality of clients and a second client counter associated with a second client of the plurality of clients, and wherein at least one of:
a rate at which the first client counter and the second client counter change value in the opposite second direction is different;
a rate at which the first client counter and the second client counter change value in the first direction is different; or,
the specified range associated with the first client and the second client is different.

12. The system of claim 9, wherein the system is to poll each of the clients to determine whether there is an outstanding task to be executed, and wherein the system does not poll the particular client when the value of the counter is within the particular range.

13. The system of claim 9, wherein the value of the counter is to change in the opposite second direction only when the computing resource is not executing any task for the particular client.

14. The system of claim 9, wherein the value of the counter is within the particular range when the value of the counter passes a threshold value, wherein the threshold value is variable.

15. The system of claim 9, wherein the value of the counter is to change in the first direction based on at least one of:
(i) time occupied by the computing resource while executing tasks for the particular client;
(ii) a number of computations performed by the computing resource while executing the tasks for the particular client; or,
(iii) a number of data transfers performed by the computing resource while executing the tasks for the particular client.

16. A non-transitory computer readable medium having stored thereon computer-executable instructions that, when executed by a computer, cause the computer to perform operations comprising:
communicating with a plurality of clients to receive tasks from the clients and execute the tasks using a computing resource; and
for a particular client of the plurality of clients, maintaining a counter that changes value in a first direction in response to the computing resource executing a task for the particular client and otherwise changes value in an opposite second direction;
wherein an amount by which the counter changes during or after execution of the task in response to the computing resource executing the task is based on how much of the computing resource was occupied during execution of the task;
wherein new tasks from the particular client are not executed while the value of the counter is within a particular range; and
wherein the amount by which the value of the counter changes in the first direction in response to the computing resource executing the task for the particular client is offset by an amount stored in a second counter indicative of how much time elapsed during the execution of the task using the computing resource.

17. The non-transitory computer readable medium of claim 16, wherein a respective counter is maintained for each client of the plurality of clients, wherein for each client, the respective counter changes value in the first direction in response to the computing resource executing a respective task for that client and otherwise changes value in the opposite second direction; and
wherein for each client, the computing resource refrains from executing an outstanding task from that client in response to the value of the respective counter for that client being within a specified range associated with that client.

18. The non-transitory computer readable medium of claim 17, wherein a first client of the plurality of clients is associated with a first client counter, wherein a second client of the plurality of clients is associated with a second client counter, and wherein at least one of:
a rate at which the first client counter and the second client counter change value in the opposite second direction is different;

a rate at which the first client counter and the second client counter change value in the first direction is different; or, the specified range associated with the first client and the second client is different.

19. The non-transitory computer readable medium of claim 16, wherein the value of the counter is within the particular range when the value of the counter passes a threshold value, wherein the threshold value is variable.

20. The non-transitory computer readable medium of claim 16, wherein the value of the counter changes in the first direction based on at least one of:
   (i) time occupied by the computing resource while executing tasks for the particular client;
   (ii) a number of computations performed by the computing resource while executing the tasks for the particular client; or,
   (iii) a number of data transfers performed by the computing resource while executing the tasks for the particular client.

\* \* \* \* \*